United States Patent
Botzas

(10) Patent No.: US 7,236,772 B1
(45) Date of Patent: Jun. 26, 2007

(54) WIRELESS CALL INFORMATION TRANSFER

(75) Inventor: Anthony Botzas, Allentown, PA (US)

(73) Assignee: Agere Systems Inc., Allentown, PA (US)

( * ) Notice: Subject to any disclaimer, the term of this patent is extended or adjusted under 35 U.S.C. 154(b) by 1434 days.

(21) Appl. No.: 09/619,401

(22) Filed: Jul. 19, 2000

Related U.S. Application Data

(60) Provisional application No. 60/145,598, filed on Jul. 26, 1999.

(51) Int. Cl.
*H04M 3/42* (2006.01)
(52) U.S. Cl. .................. 455/415; 455/422.1; 455/461; 455/445; 455/414.1; 379/211.01; 379/211.02; 379/212.01
(58) Field of Classification Search ............... 455/445, 455/422, 417, 456, 566, 554, 433, 461–462, 455/465, 554.1, 555, 412.1, 564, 408, 406, 455/432, 405, 414, 421, 235.1, 442, 74.1, 455/415, 414.1, 422.1, 456.1–456.6; 379/211, 379/219, 220, 211.01, 211.02, 212.01
See application file for complete search history.

(56) References Cited

U.S. PATENT DOCUMENTS

| | | | | |
|---|---|---|---|---|
| 5,724,656 A | * | 3/1998 | Vo et al. ..................... | 455/422 |
| 5,920,815 A | * | 7/1999 | Akhavan ..................... | 455/426 |
| 5,966,652 A | * | 10/1999 | Coad et al. ............... | 455/412.1 |
| 6,216,005 B1 | * | 4/2001 | Agrawal et al. ............ | 455/445 |
| 6,453,164 B1 | * | 9/2002 | Fuller et al. ................ | 455/445 |
| 6,477,374 B1 | * | 11/2002 | Shaffer et al. .............. | 455/445 |
| 6,631,188 B1 | * | 10/2003 | Sands .................... | 379/215.01 |
| 2002/0049073 A1 | * | 4/2002 | Bell ........................ | 455/552.1 |

\* cited by examiner

*Primary Examiner*—Naghmeh Mehrpour

(57) ABSTRACT

According to one embodiment of the invention, a cellular telephone includes a memory and a transmitter. The memory is adapted to store a telephone number associated with an incoming telephone call, and the transmitter is adapted to transmit the telephone number to another telephone. The cellular telephone may also include a receiver and a calling unit. The receiver is adapted to receive a different telephone number from the another telephone, and the calling unit is adapted to place an outgoing telephone call to the different telephone number. In an alternative embodiment, a method of placing a telephone call from a telephone includes the steps of receiving, over a wireless link, call related information from another telephone, and placing an outgoing call based on the call related information. The other telephone may be a cellular telephone, and the call related information may include a telephone number associated with a telephone call previously received by the other telephone.

20 Claims, 2 Drawing Sheets

WIRELESS CALL INFORMATION TRANSFER

This application claims priority to U.S. Provisional Patent Application 60/145,598, filed Jul. 26, 1999, the entirety of which is incorporated herein by reference.

FIELD OF THE INVENTION

The invention is related to the field of telephony, and in particular to the field of cellular telephony.

BACKGROUND OF THE INVENTION

A feature of a cellular telephone is its storage of call related information, such as Caller ID data, associated with incoming or outgoing telephone calls. A particular operation facilitated by this feature is the ability to easily return a missed telephone call. For example, when a telephone call is missed, the operator may be able to locate the number of the missed call, and then press a single button to initiate a return call.

A drawback of the above described operation is that the user of the cellular telephone may incur fees associated with the placement of the return call, or may use up minutes associated with a particular billing plan. This is problematic, particularly when the user is proximate to a PSTN-based telephone, such as a conventional wired telephone or a cordless telephone. Alternatively, the user may elect to locate the return telephone number on the cellular telephone, and then place the return telephone call by dialing the return telephone number on the user's PSTN-based telephone. Surprisingly, it may be perceived as too much of a hassle for the user to actually dial the return telephone number, in which case the user may elect to take the simplest route by returning the call via the cellular telephone.

There is a need, therefore, for a simplified process whereby the user can easily return the telephone call received via a cellular telephone by employing a proximate PSTN-based telephone.

Similarly, the advantageous route may not be to return the call via a PSTN-based telephone, but to instead return the call via another cellular telephone. For example, if a married couple has two telephones, and one of them has used up most of its time allocation for the month, it may be preferred to return an incoming telephone call received on the one telephone by using the other telephone. As another example, if two business associates are meeting, and one receives an incoming call on a cellular telephone that is roaming, it may be preferred to return the incoming call from the other's non-roaming cellular telephone. In these cases, a simplified process is needed to facilitate this advantageous operation.

SUMMARY OF THE INVENTION

These needs are met, according to one embodiment of the invention, by a cellular telephone that includes a memory and a transmitter. The memory is adapted to store a telephone number associated with an incoming telephone call, and the transmitter is adapted to transmit the telephone number to another telephone. The cellular telephone may also include a receiver and a calling unit. The receiver is adapted to receive a different telephone number from a telephone, such as the other telephone, and the calling unit is adapted to place an outgoing telephone call to the different telephone number.

In an alternative embodiment, a method of placing a telephone call from a telephone includes the steps of receiving, over a wireless link, call related information from another telephone, and placing an outgoing call based on the call related information. The other telephone may be a cellular telephone, and the call related information may include a telephone number associated with a telephone call previously received by the another telephone.

BRIEF DESCRIPTION OF THE DRAWING

Objects and advantages of the invention will be apparent to one of skill in the art upon review of the following detailed description in light of the drawing, wherein.

DETAILED DESCRIPTION

Figure 1:
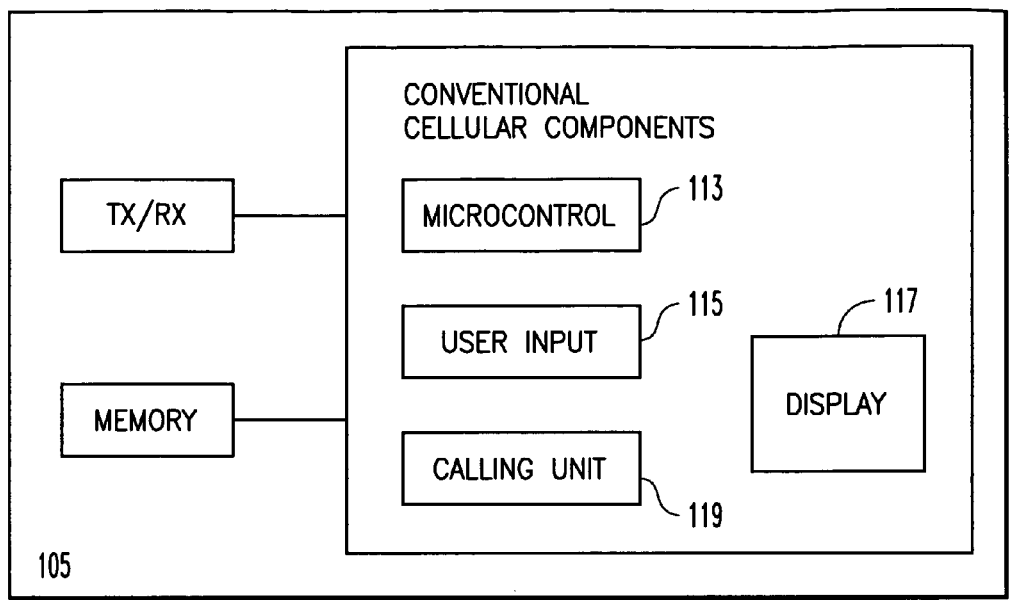
FIG. 1 is a simplified block diagram of a cellular telephone in accordance with one embodiment according to the invention.

As shown in FIG. 1, cellular telephone 105 includes conventional cellular components 107, some of which are particularly shown, and also includes a memory 109 and a transceiver 111. As will be clear to one of ordinary skill in the art, it is possible to utilize many of the conventional cellular components 107 in the practice of the invention. It is also possible to use separate components configured exclusively for the practice of the invention that are not utilized when engaged in a conventional cellular telephone call. By way of illustration only, the exemplary embodiment of cellular telephone 105 employs a separate memory 109 and a separate transceiver 111 for use in practicing the invention. According to this embodiment, these components are not employed when cellular telephone 105 is engaged in a conventional cellular telephone call.

In addition to engaging in conventional cellular telephone activity, cellular telephone 105 is also configured to transmit call related information, such as Caller ID data associated with a received telephone call, from a transmitter portion of transceiver 111. For example, transceiver 111 may be a personal area network or piconet transceiver, such as according to the Bluetooth standard. Information on the Bluetooth standard may be found, for example, at http://www.bluetooth.com, incorporated herein by reference.

Cellular telephones are beginning to employ the Bluetooth standard as a way of replacing the wire that traditionally couples a headset to the cellular telephone. The inventor has recognized an alternative use of the Bluetooth functionality. Thus, for a particular cellular telephone 105 that is configured with a transceiver to communicate with a corresponding headset, that transceiver may also be employed as transceiver 111. Further, the memory 109 may be a memory that is part of the conventional cellular components 107, such as is used to store telephone numbers associated with a phone book feature. In such a case, the invention may be realized by simply providing microcode, such as for use in microcontroller 113, for use in practicing the invention.

Figure 2:
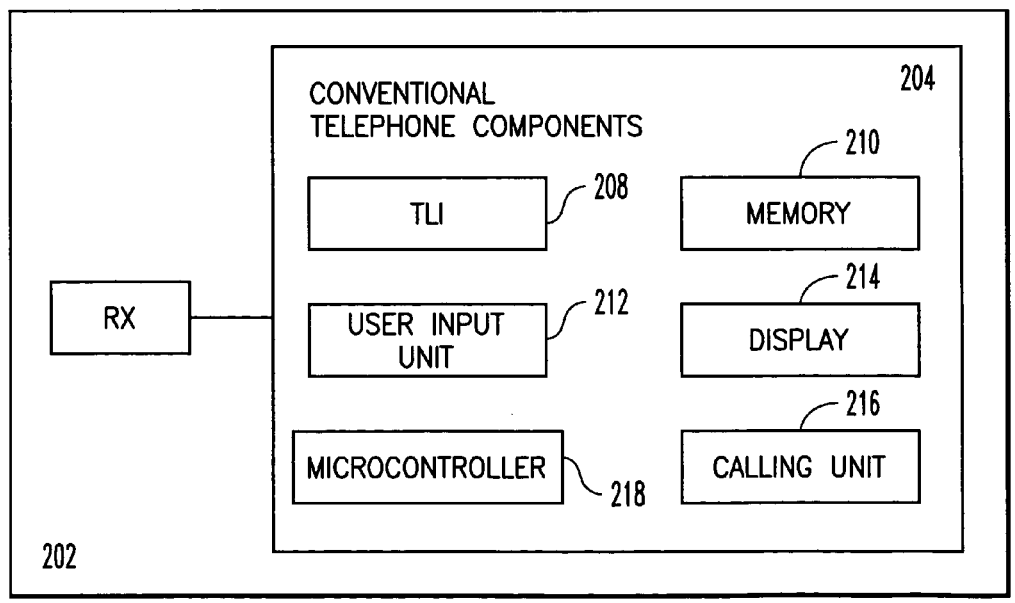
FIG. 2 is a simplified block diagram of another telephone, such as a PSTN-based telephone or another cellular telephone, that may be wirelessly linked with the cellular telephone of FIG. 1 in accordance with one embodiment according to the invention.

In particular, when an incoming call is received, such as, for example, an incoming call that is not answered (i.e., a missed call), call related information, such as Caller ID data associated with the incoming call, are stored in memory 109. These data are then transmitted, via transceiver 111 and any associated antennae, so that they may be received by another telephone, such as telephone 202 shown in FIG. 2. In one embodiment, the data are transmitted according to the Bluetooth standard.

Telephone 202 contains conventional telephone components 204, as well as a receiver 206 adapted to receive Bluetooth transmissions. The conventional telephone components 204 may include a telephone line interface (TLI) 208 if telephone 202 is a public switched telephone network (PSTN) based telephone. Alternatively, the conventional telephone components may include cellular components if the telephone 202 is a cellular telephone, or cordless telephony components configured within a base unit and a handset if telephone 202 is a cordless telephone. For purposes of illustration, telephone 202 includes a TLI and is thus a PSTN-based telephone. It should be noted that alternative land-line based or fixed telephones, such as webphones or other voice over IP configurations are intended to be encompassed by the general description of telephone 202. Further, as transceiver 111 of cellular telephone 105 may both transmit and receive, it is possible for telephone 202 to be a cellular telephone configured in a manner similar to telephone 105. For purposes of illustration, therefore, calling unit 119 is provided in telephone 105 to perform a like function to calling unit 216 of telephone 202.

In any event, according to the invention, call related information is transmitted from transceiver 111 of cellular telephone 105; and is received by receiver 206 of telephone 202. Thus, for example, data associated with an incoming call to cellular telephone 105 are received by receiver 206. These data may be stored, for example, in memory 210 of the conventional telephone components 204. Alternatively, as in the example of telephone 105, a separate memory may be provided in telephone 202 for the purposes of carrying out the invention.

The transfer of the call related information may be automatic, such as upon the completion of the incoming call or upon the termination of the incoming call with no answer. Alternatively, the transfer of the information may be directed by a user of the cellular telephone 105, such as by providing input to a user input unit 115, such as a keypad, while receiving feedback via a display 117. For illustrative purposes, the user input unit 115 and display 117 are shown as part of the conventional cellular components 107, as most cellular telephones include a keypad and a display.

Similarly, in telephone 202, the reception of the call related information may be automatic, or may be directed by a user, such as by providing input to user input unit 212 while receiving feedback from display 214. Further, the user may instruct telephone 202 to place an outgoing call, via calling unit 216, based on the call related information.

Figure 3:
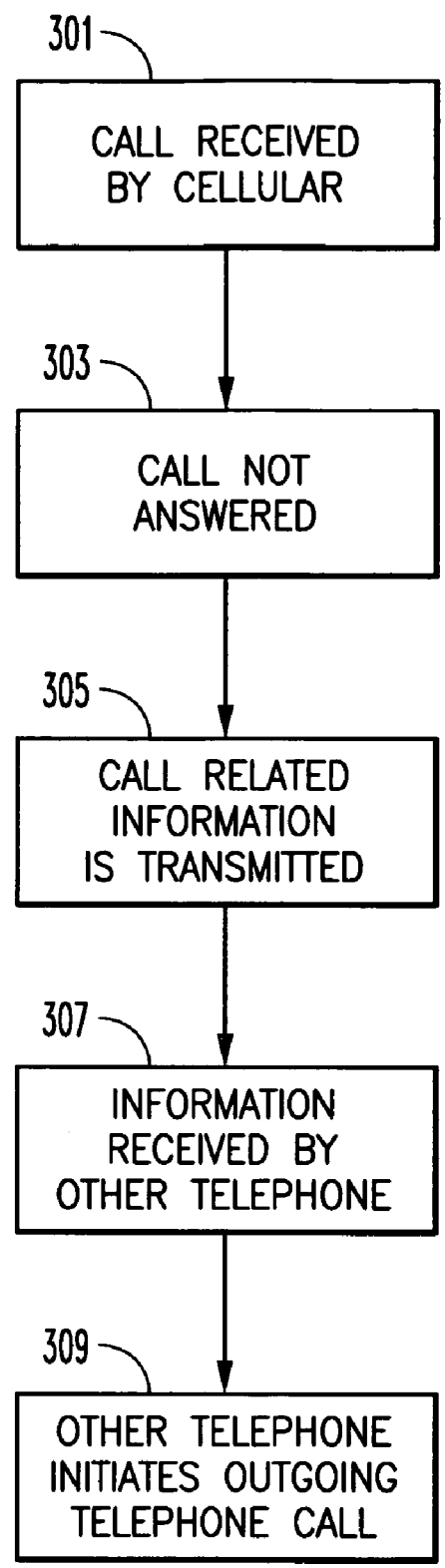
FIG. 3 is a simplified operational flowchart in accordance with one embodiment according to the invention.

FIG. 3 provides an example of an operational flowchart to illustrate the functions of cellular telephone 105 and telephone 202 according to the invention. In step 301, a call is received by cellular telephone 105. In step 303, the call is not answered. This means, for example, that either the incoming caller hangs up before the call is answered, or the call is transferred to a voicemail system before it is answered. In step 305, call related information associated with the unanswered call is transmitted via transceiver 111. This may occur automatically or by user direction. Also, if under user direction, the call related information from a plurality of unanswered calls may be transmitted.

In step 307, the call related information is received by receiver 206. This information may also be automatically displayed on display 214, such as under the control of microcontroller 218. Subsequently, at step 309, an outgoing telephone call is placed by telephone 202 based on the call related information. For example, the call related information may contain Caller ID data associated with an incoming caller for the missed incoming call, and the outgoing telephone call may be placed to the incoming caller by calling the telephone number contained in the Caller ID data.

The outgoing call may be placed in accordance with user instructions. For example, the user may see the proposed telephone number on the display 214, and may then activate one or more keys on the user input unit 212. Microcontroller 218 can then respond to an associated input signal from user input unit 212 to cause the calling unit 216 to place the outgoing call, such as via the TLI 208. It is, of course, possible for more than one potential target telephone number to be stored in memory 210 and/or displayed on display 214. In such a case, the user may activate user input unit 212 to scroll through the stored numbers or select the intended target telephone number in some other manner.

Thus, according to the invention, a user can elect to easily place an outgoing call, such as a return call, from an instrument that is most economical or most convenient. For example, instead of returning a call from the instrument that received the call, the user can elect to place the call from another instrument, such as a cellular telephone that has a greater amount of time left in its plan, or is in a non-roaming status, or from a land-line telephone.

Based on an understanding of these various embodiments, one of skill in the art is likely to conceive of alternative embodiments that are not specifically enumerated here, but that are clearly within the scope of the invention. For example, although the embodiments discussed above are primarily focused on the transfer of a single telephone number associated with a single unanswered telephone call, or a plurality of telephone numbers associated with a plurality of unanswered telephone calls, the inventive concepts may also be employed to transfer a large amount of data, and this data may not be related to unanswered telephone calls. For example, the data may be associated with a set of clients, a telephone book, or some other set of telephone numbers that a user simply wants to download from one telephone to another, for example, over a Bluetooth-type link.

The invention claimed is:

1. A telephone for a communication system, the system adapted to perform a communication scenario in which:

a first telephone, having a first telephone number, initiates a first telephone call to a second telephone, the second telephone having a second telephone number different from the first telephone number;

the second telephone automatically extracts the first telephone number from CallerID information of the first telephone call and transmits the extracted first telephone number to a third telephone, the third telephone having a third telephone number different from the first and second telephone numbers; and the third telephone receives the transmitted first telephone number from the second telephone and initiates a second telephone call to the first telephone using the received first telephone number received from the second telephone, wherein the telephone is the second telephone or the third telephone.

2. The invention of claim 1, wherein the telephone is the second telephone.

3. The invention of claim 2, wherein the second telephone comprises:
- a processor adapted to automatically extract the first telephone number from the CallerID information of the first telephone call; and
- a transmitter adapted to transmit the extracted first telephone number to the third telephone.

4. The invention of claim 3, wherein the transmitter is a non-telephony transmitter.

5. The invention of claim 4, wherein the transmitter is a Bluetooth transmitter.

6. The invention of claim 2, wherein, without any user intervention after the first telephone call is initiated, the second telephone automatically transmits the extracted first telephone number to the third telephone.

7. The invention of claim 2, wherein, based on a single user key-stroke, the second telephone transmits the extracted first telephone number to the third telephone.

8. The invention of claim 2, wherein, without answering the first telephone call, the second telephone automatically extracts the first telephone number from the CallerID information of the first telephone call and transmits the extracted first telephone number to the third telephone.

9. The invention of claim 2, wherein the second telephone is a cellular telephone.

10. The invention of claim 1, wherein the telephone is the third telephone.

11. The invention of claim 10, wherein the third telephone comprises:
- a receiver adapted to receive the transmitted first telephone number from second telephone; and
- a calling unit adapted to initiate the second telephone call to the first telephone using the received first telephone number.

12. The invention of claim 11, wherein the receiver is a non-telephony receiver.

13. The invention of claim 12, wherein the receiver is a Bluetooth receiver.

14. The invention of claim 10, wherein, based on a single user key-stroke, the third telephone initiates the second telephone call to the first telephone using the received first telephone number.

15. The invention of claim 1, wherein the transmission of the extracted first telephone number from the second telephone to the third telephone is by non-telephony communications.

16. The invention of claim 15, wherein the transmission of the extracted first telephone number from the second telephone to the third telephone is by Bluetooth communications.

17. The invention of claim 1, wherein:
the second telephone is a cellular telephone comprising:
- a processor adapted to automatically extract the first telephone number from the CallerID information of the first telephone call;
- memory adapted to store the extracted first telephone number; and
- a non-telephony transmitter adapted to transmit the extracted first telephone number to the third telephone using non-telephony communications; and the third telephone comprises:
- a non-telephony receiver adapted to receive the transmitted first telephone number from second telephone using the non-telephony communications;
- a memory adapted to store the received first telephone number; and
- a calling unit adapted to initiate the second telephone call to the first telephone using the received first telephone number.

18. A method implemented by a telephone in a communication system performing a communication scenario comprising:
- initiating, by a first telephone having a first telephone number, a first telephone call to a second telephone, the second telephone having a second telephone number different from the first telephone number;
- automatically extracting, by the second telephone, the first telephone number from CallerID information of the first telephone call;
- transmitting, by the second telephone, the extracted first telephone number to a third telephone, the third telephone having a third telephone number different from the first and second telephone numbers;
- receiving, by the third telephone, the transmitted first telephone number from the second telephone; and
- initiating, by the third telephone, a second telephone call to the first telephone using the received first telephone number received from the second telephone, wherein the method is a portion of the communication scenario implemented by the second telephone or the third telephone.

19. The invention of claim 18, wherein the method comprises the automatically extracting step and the transmitting step implemented by the second telephone.

20. The invention of claim 18, wherein the method comprises the receiving step and the initiating step implemented by the third telephone.

* * * * *